July 30, 1957 J. P. ECKERT, JR., ET AL 2,801,345

REGENERATIVE PULSE TRANSLATING CIRCUIT

Filed Aug. 24, 1955 2 Sheets-Sheet 1

INVENTORS
JOHN PRESPER ECKERT, JR.
BY THEODORE H. BONN

Charles C. English

AGENT

INVENTORS
JOHN PRESPER ECKERT, JR.
THEODORE H. BONN
BY Charles C. Enfield
AGENT

United States Patent Office 2,801,345

Patented July 30, 1957

2,801,345

REGENERATIVE PULSE TRANSLATING CIRCUIT

John Presper Eckert, Jr., and Theodore H. Bonn, Philadelphia, Pa., assignors to Sperry Rand Corporation, New York, N. Y., a corporation of Delaware Application August 24, 1955, Serial No. 530,301

18 Claims. (Cl. 307—88)

This invention relates to regenerative pulse translating circuits and more particularly to such circuits utilizing transistors.

There are prior copending applications assigned to the same assignee as the present invention in which a transistor is employed to amplify pulses, and regeneration increases the gain of the system. See for example the prior copending applications of John Presper Eckert, Jr., Serial No. 524,844, filed July 28, 1955, entitled "Amplifier With Feedback," and Serial No. 524,842, filed July 28, 1955, entitled "Amplifier for Pulse Type Signals."

The present invention has for its purpose, increasing and improving the performance and flexibility of transistor computing circuits in which regeneration is employed.

The primary object of the invention is to provide an improved regenerative circuit for pulse translating systems.

Another object of the invention is to provide a transistor amplifying circuit, employing regeneration, in which the performance and flexibility of the circuit is increased and improved.

An additional object of the invention is to provide a pulse translating circuit which is low in cost, efficient in operation, as well as reliable.

Yet an additional object of the invention is to provide a pulse translating circuit having an improved way of feeding input signals thereto.

Still another object of the invention is to provide a pulse translating circuit utilizing a transistor amplifier, in which substantially all of the transistor circuit output is employed for regeneration when the input pulse is first received and later substantially all of the output energy of the transistor is fed to the outputs of the system, whereby the efficiency of the circuit is improved.

A further object of the invention is to provide a system as described in the preceding object in which the threshold at which output begins to appear is coordinated with a biasing potential on the transistor to thereby stabilize and improve the operation of the system.

An additional object of the invention is to provide a pulse translating system having a magnetic core, the system resetting itself after each pulse has been translated so that it is ready to receive a new input pulse.

Other objects and advantages of the system will appear as this description proceeds.

Briefly speaking, the invention employs a magnetic core having an input winding thereon. The circuit is receptive to input signals at predetermined periodic intervals, as is customary in pulse-type computer systems. An input pulse will tend to increase the flux and thus move the core a short distance up its hysteresis loop. This will induce potential in a regeneration coil which feeds the input of a transistor. The output of the transistor feeds another coil on the core with an amplified pulse that increases the flux in the core until the latter is driven to saturation. Output coils on the core respond to the change in flux and produce output signals. When the core reaches saturation further regeneration cannot occur and the output terminates. In certain specific forms of the invention the core is reset to the datum point on its hysteresis loop and this may be achieved in any desired way, so far as the broader aspects of the invention are concerned. Two specific ways of doing this are disclosed in the application. One of these ways includes utilizing a substantially linear B–H hysteresis loop whereby the core will automatically return to its starting point when the regenerative action ceases. A second way of doing this includes placing a resetting coil on the core which is connected to a pulse generator so timed with respect to the appearance of input pulses that between two input pulses a resetting pulse will flow through the resetting coil and thus restore the core to its initial operating point.

Preferably threshold means are added to the output whereby during the receipt of the small input signals, none of the flux change in the core feeds the output and thus all of the energy of the system is available to start the regenerative process, but as soon as the regenerative process is well under way and the rate of change of flux in the core increases to a large value, a threshold is reached at which output potentials appear, and under these circumstances a large part of the energy of the system is fed to the outputs as distinguished from being used for regeneration. While several threshold arrangements may be employed, one in particular uses a power supply for establishing a threshold potential for the collector electrode of the transistor, whereby the threshold potential and the negative bias of the transistor vary proportionately. This increases the stability and reliability of the system. Further details will appear as the description proceeds.

Figure 1:
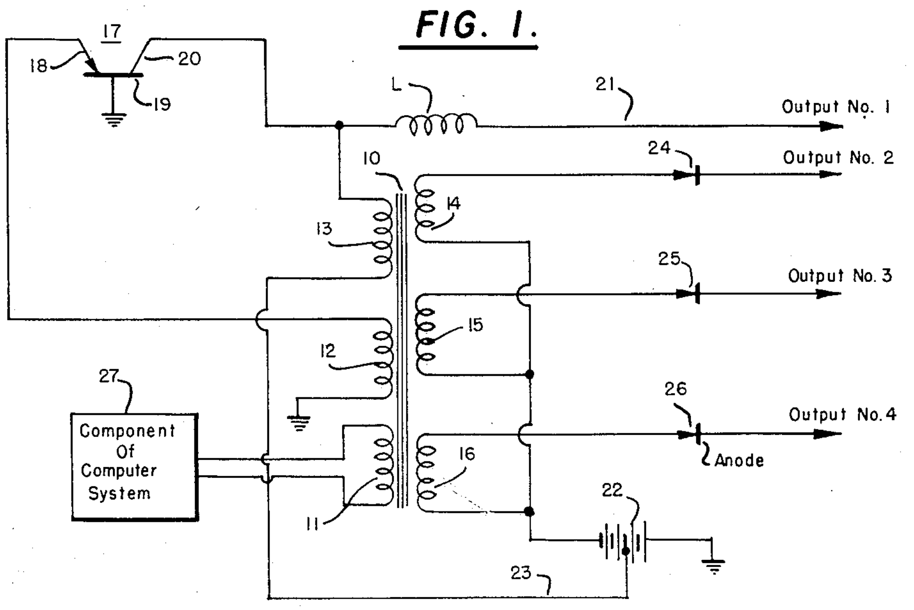
Figure 1 is a schematic diagram of one form of the invention.
Figure 2:
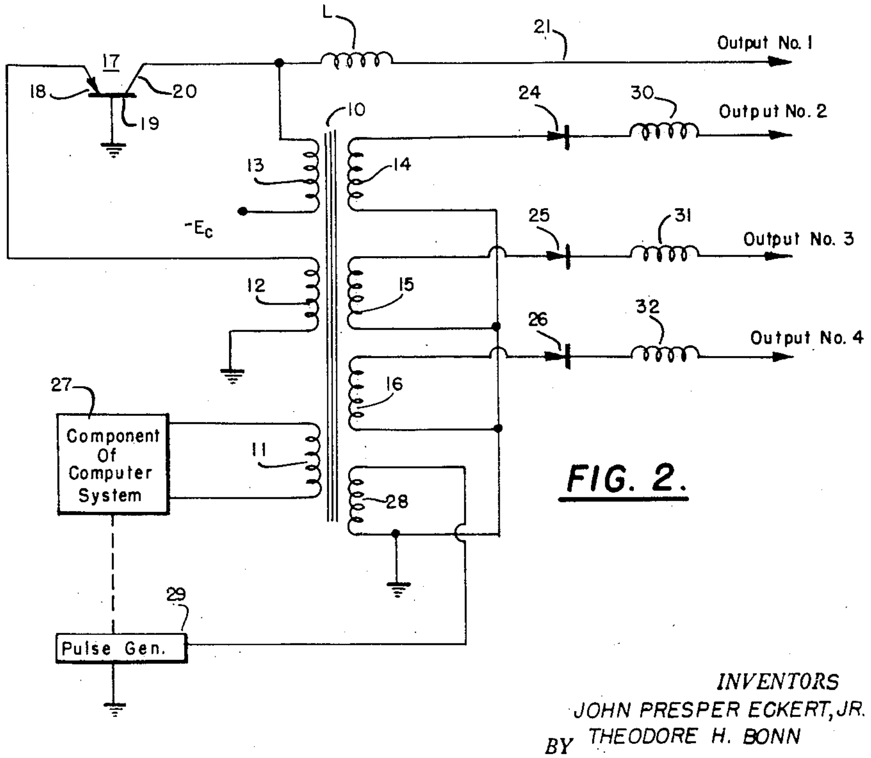
Figure 2 is a schematic diagram of a modified form of the invention.
Figure 4:
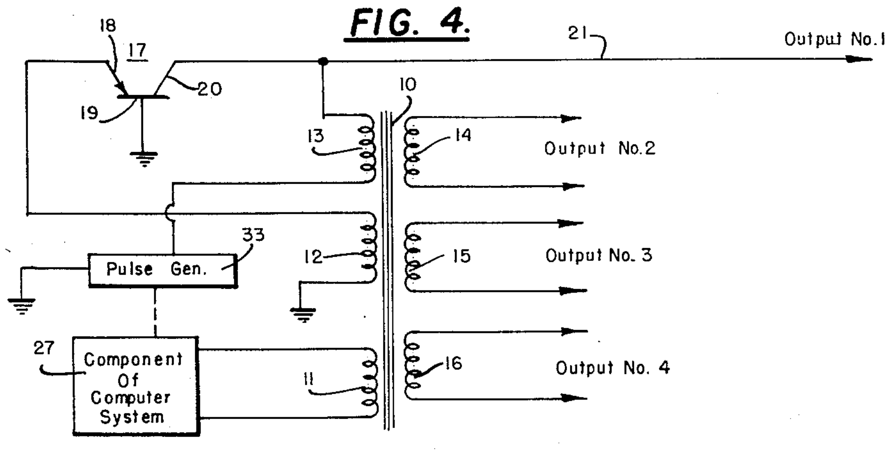
Figure 4 is a schematic diagram of a further modified form of the invention.

In Figures 1, 2 and 4 a core 10 has an input coil 11 a regeneration coil 12, an amplifying coil 13, and three output coils 14, 15 and 16. These coils are the same in all three modified forms of the invention. However, it is understood that variations may be made in the number and arrangement of these coils and in particular some of the coils may be combined with each other if desired and thus the number of coils reduced. Moreover, the number of output coils may be increased or reduced. In fact, if desired, all the output coils can be eliminated and the output derived otherwise as will appear hereinafter in the description. The differences between Figures 1, 2 and 4 relate to the way in which the coils are energized and connected. Each of these circuits includes a transistor 17 having an emitter electrode 18 fed by the regeneration winding 12, a collector electrode 20 feeding the amplifying winding 13, and a grounded base electrode 19. A supplemental output 21 from the coil 13 may be provided, it being understood that this output 21 may be regarded as fed by the collector electrode 20 instead of by the coil 13.

In Figure 1, a battery or other source of direct current 22 has its positive side grounded and includes a tapped negative pole 23 feeding the lower end of coil 13 to thus provide the negative operating potential, or bias, for the collector electrode 20. The lower ends of the output coils 14, 15 and 16 are connected to the negative pole of battery 22, the other ends of these coils being respectively connected through rectifiers 24, 25 and 26 to three output circuits, respectively, of the system.

The core 10 may have any shape of hysteresis loop, such as for example, rectangular or linear, but in the form shown in Figure 1 it is preferable to have a substantially linear B–H curve and fo rthe purposes of the following description of that figure, such a curve will be assumed.

It is understood in connection with pulse-type computer systems, that information pulses only occur at certain predetermined intervals. An example of this appears in Figure 5 where the first ten time periods of a system are indicated. Input pulses appear in this system only during odd numbered time periods. The input pulses do not appear at all of the odd numbered time periods but only at certain predetermined ones thereof, and the appearance or lack of appearance at a particular time interval indicates one item of information, all as is well understood by computer engineers. In Figure 1 a component 27 of a computer system is illustrated as feeding the input coil 11. It is understood that this component 27 provides input pulses that contain the information passing through the entire system. This information is in the form of pulses. Input pulses are eligible to occur at any odd numbered time period and either occur or do not occur according to the information in the system. When such a pulse does occur, it flows through the coil 11 and finds the core 10 at a datum point on its hysteresis loop. In the case of a linear loop this would be at or near the intersection of the B and H axes. The pulse in coil 11 is relatively small and therefore can drive the core 10 only a short distance up its hysteresis loop. However, when the core is driven that short distance, potential is induced in coil 12 which is amplified by the transistor 17 and flows in amplified form through the coil 13. This greatly increases the flux in the core 10 which increases the induced potential in the coil 12 which provides further input current for the transistor 17 and therefore provides a still greater current in coil 13. The regenerative action continues and the flux in the core is rapidly built up to saturation. The four outputs respond to the rapid increase in flux and produce signals at the four outputs.

It is desirable that the four outputs do not load the system at the very beginning of the regenerative process, as that would absorb energy which is needed for a rapid buildup of the regenerative action. Consequently, threshold means are incorporated in connection with output coils 14, 15 and 16. This threshold means includes a battery 22 and the rectifiers 24, 25 and 26. The negative side of battery 22 normally biases rectifiers 24, 25 and 26 to cut off and no output will appear until the potentials induced in coils 14, 15 and 16 respectively exceed the potential of battery 22, at which time output signals will begin to appear at the lower three outputs. A threshold device may also be incorporated in connection with output 21, and would normally be so used. In the alternative, an inductor L may be placed in output 21 to delay the appearance of current at output #1 and thus give the regenerative process a chance to build up before the system is fully loaded.

Another feature of the invention resides in the provision of a common power supply 22 for the threshold circuit as well as for the collector electrode 20 of the transistor 17. This insures that any variations in the potential of the power supply 22 will be reflected both in the threshold circuit and in the transistor circuit. Since the collector electrode and the threshold circuits are energized by a common source, their relative adjustment will not be unbalanced by a variation in potential of the power supply and thus once the device is placed in proper operating condition it will remain that way.

Figure 3:
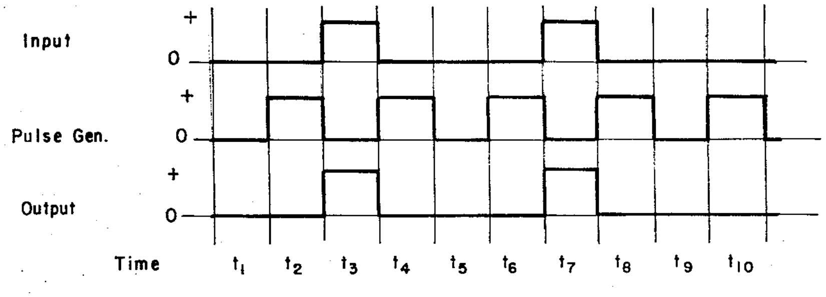
Figure 3 is a timing diagram for the device of Figure 2.

Figure 2 is a modified form of Figure 1 in which the core 10 has a substantially rectangular hysteresis loop instead of a linear one. With this type of material, after the core is rapidly built up to saturation, it will remain at positive remanence unless something is done to restore it to its original starting point which is preferably negative remanence. Hence, without some means for restoring the core to negative remanence, only the first pulse fed to the input coil 11 would appear at the outputs. Consequently a coil 28 is provided fed by a pulse generator 29. As hereinbefore explained, the component 27 produces pulses only during odd numbered time periods. Figure 3 is a timing diagram for the device of Figure 2 and shows the relation of the pulses just mentioned to the input and output pulses. In Figure 1 the core 10 automatically returns to its datum point during the even numbered time periods. In Figure 2 the coil 28 in combination with the pulse generator 29, produces a large negative magnetizing force on the core 10, during each even numbered time period, and thus insures that the core is always at negative remanence at the end of each even numbered time period. If then, during an odd numbered time period, a signal appears at component 27 and flows through coil 11, the core 10 will be built up in flux somewhat above negative remanence whereupon regenerative coil 12 will energize transistor 17 which in turn will energize amplifying coil 13 and build the core up to positive remanence. Shortly thereafter at the end of that odd numbered time period the coil 28 will again be energized and the core 10 reset to negative remanence by a pulse from generator 29. In Figure 2 it is also desirable to prevent loading of the system by the outputs until the regenerative process is well under way and consequently inductors 30, 31 and 32 are included in three of the output circuits, the same as inductor L is included in output circuit 21.

Except as stated above, the circuit of Figure 2 operates in the same manner as that of Figure 1.

Figure 5:
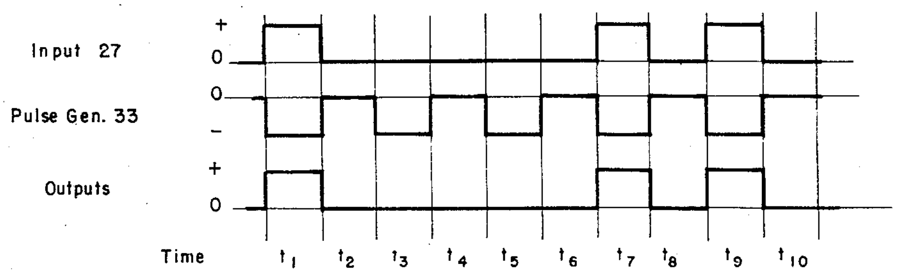
Figure 5 is a timing diagram for the circuit of Figure 4.

Figure 4 is another modified form of Figure 1 in which the lower end of coil 13 is energized by a pulse generator instead of by a source of constant potential Figure 5 is a timing diagram for the device of Figure 4. Otherwise the circuit of Figure 4 is substantially the same as that of Figures 1 and 2. It follows that if the core material 10 of Figure 4 has a linear B–H curve, parts 28 and 29 of Figure 2 are unnecessary, but if the core 10 of Figure 4 has a rectangular hysteresis loop the parts 28 and 29 should be added the same as in connection with Figure 2. Likewise, in connection with Figure 4 suitable means may be employed to prevent loading the outputs at the start of the regenerative process, the same as shown either in Figure 1 or in Figure 2.

In Figure 4 the pulse generator 33 provides a negative going pulse during each odd numbered time period. This insures that during the odd numbered time periods the transistor 17 has a negative collector potential which is necessary for its operation. During the even numbered time periods the pulse generator 33 has no output potential and thus effectively grounds the lower end of coil 13. Hence there is no negative potential on the collector electrode 20 and the transistor cannot amplify. This insures a prompt and complete cut-off of the regenerative process during the even numbered time periods and makes absolutely certain that output pulses appear only during odd numbered time periods.

While in connection with Figures 1, 2 and 4 the transistor has a grounded base connection, it should be understood that any standard connection such as the grounded emitter electrode connection or the grounded collector electrode connection can also be used in this invention. It is understood that in connection with any of the several types of transistor connections employed, the pulse generator 33 of Figure 4 may be replaced by any pulse generator that will supply any form of desired cut-off bias to any of the three electrodes of the transistor 17.

It is further understood that in connection with each of the forms of the invention it is not necessary for the output pulse to have the same duration as the input pulse. By suitably adjusting the constants of the system it may be arranged so that a very short input pulse may produce a very long output pulse and the duration of the latter with respect to the former can be controlled by varying the constants of the circuit.

One very important feature of the invention resides in feeding the input directly to a coil 11 on the core 10. This improves the response of the system as well as the efficiency and reliability. It also simplifies the system as compared with those of said prior copending applications.

We claim to have invented:

1. A pulse translating system comprising in combination a core, means for applying a magnetizing force to the core in accordance with the input signal to be amplified, a regeneration winding on the core, an amplifier fed by said regeneration winding, means fed by the output of said amplifier for applying a regenerative magnetizing force to said core in a direction additive to the magnetizing force due to the input signal, and a load fed by the output of said amplifier.

2. A pulse translating system comprising in combination a core, means for applying a magnetizing force to the core in accordance with the input signal to be amplified, a regeneration winding on the core, an amplifier fed by said regeneration winding, means fed by the output of said amplifier for applying a regenerative magnetizing force to said core in a direction additive to the magnetizing force due to the input signal, and output means controlled by the change of flux in said core.

3. A pulse translating system comprising a core, means for applying a magnetizing force to said core in accordance with input pulses to be translated, and regenerative means responsive to the change of flux set up by said input means for further changing the flux in said core and thereby increasing the energy available in the system.

4. A pulse translating system comprising a core having a plurality of coils thereon, means which at predetermined periodic intervals may feed input pulses to one of said coils, regeneration means fed by one of the coils and feeding another for building up any flux changes initiated by the input pulses, and output means coupled to one of the coils on the core.

5. A pulse translating system comprising a core, means which at predetermined periodic intervals will in response to an input signal apply a pulse of magnetizing force to the core, regeneration means coupled to the core and which in response to change in flux due to the input will build up the flux until the core saturates, and output means coupled to the core for producing an output which increases with the rate of change in the magnitude of the flux in the core.

6. A pulse translating system comprising a core, means for applying a magnetizing force to said core in accordance with input pulses to be translated, regenerative means responsive to the change of flux set up by said input means for further changing the flux in said core and thereby increasing the energy available in the system, and output means which delivers no output and therefore does not load the system when the rate of change of flux in said core is below a predetermined value but delivers an output when the rate of change of flux is above said value.

7. A pulse amplifying system comprising a core, an input coil on the core, means which at predetermined periodic intervals may supply input pulses to the core of such magnitude as to drive the core only a short distance up its hysteresis loop, a regeneration coil on the core, an amplifier fed by the regeneration coil, a third coil on the core fed by the amplifier for increasing the flux change initiated by an input pulse, and an output coil on the core.

8. A pulse amplifying system as defined in claim 7 including threshold means connected to the output coil to prevent flow of output current and consequent loading of the system as long as the rate of change of flux in the core is below a predetermined value.

9. A pulse amplifying system as defined in claim 7 including inductor means in series with the output means for delaying flow of current in the output circuit to thereby delay loading the system and thereby enabling the regenerative effect to build up the flux in the core.

10. A pulse amplifying system comprising a core, input means which at one or more predetermined periodic intervals may apply a pulse of magnetizing force to the core, a regeneration winding on the core, a transistor having an input fed by said winding, said transistor having an output in which in amplified version of the signals fed to its input appear, another winding on the core fed by the output of the transistor for building up any flux change produced by the input means, and output means which produces an output which varies with the rate of change of the flux in the core.

11. A pulse amplifying system as defined in claim 10 in which the output means is fed directly by the output of the transistor.

12. A pulse amplifying system as defined in claim 10 in which the output means includes a coil on said core.

13. A pulse translating system as defined in claim 3 in which said regenerative means includes a transistor and means responsive to change in the flux in the core for energizing the input of the transistor.

14. A pulse amplifying system as defined in claim 7 including means which during the spaces between said periodic intervals biases said amplifier to cut off and which does not cut off the amplifier during said periodic intervals.

15. A pulse amplifying system as defined in claim 7 in which the core has a substantially rectangular hysteresis loop, and means which resets the core to the datum point on its hysteresis loop during the spaces between said periodic intervals.

16. A pulse amplifying system comprising a core having a generally linear B–H curve, an input coil on the core, means which at predetermined periodic intervals may apply input signals to the input coil of a magnitude which drives the core a short distance up its hysteresis loop, a regeneration coil on the core, a transistor having an input fed by said regeneration coil, means connected to the transistor which enables the latter to respond to the signals induced in the regeneration coil during said periodic intervals but which cuts off the transistor during spaces between said intervals, said transistor having an output in which an amplified form of the input signals appear, a coil on said core fed by the output of the transistor for building up the flux in said core until saturation is reached in response to an increase in signal from the transistor, a plurality of output coils on the cores, and means connected to at least one of the output coils to reduce its loading effect for a limited time at the start of the regenerative effect of the system.

17. A pulse amplifying system comprising a core, an input coil on the core, means which at periodic intervals may apply input signals to the core of such magnitude as to drive the core only a short distance up its hysteresis loop, a regeneration coil on the core, a grounded base transistor having an emitter electrode fed by the regeneration coil and a collector electrode, means which in response to the driving of the core a short distance up the hysteresis loop causes the flux to build up further to saturation including a third coil fed at one end by the collector electrode, a power supply for applying a negative potential to the other end of the third coil and output means for giving an output that varies with variations in the flux of the core.

18. A pulse amplifying system comprising a core, an input coil on the core, means which at periodic intervals may apply input signals to the core of such magnitude as to drive the core only a short distance up its hysteresis loop, a regeneration coil on the core, a grounded base transistor having an emitter electrode fed by the regeneration coil and a collector electrode, means which in response to the driving of the core a short distance up the hysteresis loop causes the flux to build up further to saturation including a third coil fed at one end by the collector electrode, output means for giving an output that varies with variations in the flux of the core and including a rectifier for allowing the output signal to flow therethrough, and common power supply means for cutting off said rectifier and thus providing a threshold below which no output potential will appear and for negatively biasing the other end of said third coil whereby variations of the threshold bias and the collector electrode bias will be proportionate to each other.

References Cited in the file of this patent

UNITED STATES PATENTS

| | | |
|---|---|---|
| 2,696,347 | Lo | Dec. 7, 1954 |
| 2,735,021 | Nilssen | Feb. 14, 1956 |